(12) United States Patent
Kodaka et al.

(10) Patent No.: US 7,882,172 B2
(45) Date of Patent: Feb. 1, 2011

(54) THIN CLIENT SYSTEM

(75) Inventors: Hiroshi Kodaka, Chigasaki (JP); Hiroyuki Kakiuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 11/749,219

(22) Filed: May 16, 2007

(65) Prior Publication Data

US 2007/0268824 A1 Nov. 22, 2007

(30) Foreign Application Priority Data

May 17, 2006 (JP) .............................. 2006-137206

(51) Int. Cl.
*G06F 15/16* (2006.01)
(52) U.S. Cl. ......................... 709/203; 725/146; 345/3.1
(58) Field of Classification Search .................. 709/203
See application file for complete search history.

(56) References Cited

U.S. PATENT DOCUMENTS

| | | | | |
|---|---|---|---|---|
| 5,767,897 | A * | 6/1998 | Howell | 348/14.07 |
| 7,075,544 | B2 * | 7/2006 | Kim et al. | 345/543 |
| 2002/0122075 | A1 * | 9/2002 | Karasawa et al. | 345/846 |
| 2002/0133580 | A1 * | 9/2002 | Dake et al. | 709/223 |
| 2003/0177497 | A1 * | 9/2003 | Macrae et al. | 725/60 |
| 2003/0225846 | A1 * | 12/2003 | Heikes et al. | 709/207 |
| 2004/0012613 | A1 * | 1/2004 | Rast | 345/632 |
| 2004/0036812 | A1 * | 2/2004 | Ueda et al. | 348/734 |
| 2004/0164925 | A1 * | 8/2004 | Boger | 345/3.1 |
| 2004/0234088 | A1 * | 11/2004 | McCarty et al. | 381/306 |
| 2005/0091701 | A1 * | 4/2005 | Hogyoku | 725/146 |
| 2005/0144645 | A1 * | 6/2005 | Casey et al. | 725/95 |
| 2006/0136965 | A1 * | 6/2006 | Ellis et al. | 725/46 |
| 2007/0076963 | A1 * | 4/2007 | Liu | 382/236 |
| 2007/0089145 | A1 * | 4/2007 | Medford et al. | 725/81 |

FOREIGN PATENT DOCUMENTS

| | | |
|---|---|---|
| JP | 10-164620 | 6/1998 |
| JP | 11-041583 | 2/1999 |
| JP | 2004-056777 | 2/2004 |
| JP | 2005-057771 | 3/2005 |

OTHER PUBLICATIONS

Nikkei Communication, Nov. 25, 2005, 8 pages.
Nikkei Communication, Nov. 25, 2005, pp. 50-53.

\* cited by examiner

*Primary Examiner*—Firmin Backer
*Assistant Examiner*—Hamza Algibhah
(74) *Attorney, Agent, or Firm*—Antonelli, Terry, Stout & Kraus, LLP.

(57) ABSTRACT

In a thin client system which provides a high-quality picture reproduction method and which makes it possible to use a thin client terminal as a TeleVision (TV) phone terminal and a TV conference terminal, a video reproducing module is disposed in a thin client server device and a graphics module is disposed in a thin client terminal. The thin client server device sets a transmission color to a video display area of screen data and sends the screen data via a remote control communication path and simultaneously sends video data via a second route. The thin client terminal receives the screen data and the video data and displays the screen and video data as an overlay image in one same screen using the screen overlay scheme.

8 Claims, 8 Drawing Sheets

THIN CLIENT SYSTEM

INCORPORATION BY REFERENCE

The present application claims priority from Japanese application JP2006-137206 filed on May 17, 2006, the content of which is hereby incorporated by reference into this application.

BACKGROUND OF THE INVENTION

1. Field of the Invention

The present invention relates to a thin client system as well as to a thin client terminal, a thin client server device, and the like suitably applicable to the thin client system, and in particular, to a system, a terminal, a server device, a method, and the like in which a thin client terminal applied to a thin client system is also available as, for example, a TeleVision (TV) phone terminal and a TV conference terminal.

2. Description of the Related Art

Thanks to reduction in the price of personal computers (PC) and network apparatuses today, most enterprises and firms attempt to efficiently achieve business and jobs by distributing terminals such as personal computers to most of the employees. As a result of the reduction in the PC price and the increase in the chance to use the personal computers, the maintenance job of the manager of the computers and the like in the firm also increases in proportion to the increase in the number of personal computers. The maintenance job includes, for example, update of the versions of operating systems (OS) and job application (AP) programs, fixing of bugs or debugging of the operating systems and the application programs, taking of countermeasures against hardware failure, introducing of anti-virus measurements, and extermination of viruses. Therefore, the operation management cost including the cost for the maintenance conspicuously soars, leading to a problem which cannot be ignored. The management cost increases tremendously in proportion to the increase in the number of employees.

As a method to reduce the management cost, there exists a system operation method called "server-based computing". This is a system in which, for example, the personal computers (clients) used by the employees are assigned with necessary and minimum functions such that the resources such as applications (programs) and files (including data) are managed on the server side in a centralized fashion and the programs and data are accessed from the PC terminals through remote control operation.

In more detail, to achieve a job using a PC terminal, the operator activates an application program on the server side by use of devices such as a keyboard and a mouse on the PC terminal side. Screen data to be displayed on the PC terminal side is created by the application and then the screen data is transmitted to the PC terminal side through the remote control communication path. In the system configuration, data cannot be saved on the terminal side. The Internet Protocol (IP) network coupling the terminal with the server is used to transfer therethrough data of the keyboard (key stroke) and/or a mouse (mouse click) from the PC terminal and screen data (screen transition) of applications from the server. The screen data is transmitted by the remote control as below. According to a method in which the screen data is sent from the server side via the network to the PC terminal side to be displayed on the PC terminal side, the server side detects an update area or section of the screen and then compresses the updated screen data to transfer the updated screen data to the PC terminal side. The PC terminal side receives the data and sets the data as screen information to thereby update the screen. In this method, only the update section of information, i.e., the differential information is transferred, and hence it is possible to reduce the amount of data to be transferred through the network.

As above, by allowing the PC terminal to save therein only the remote control program, i.e., by preventing the PC terminal from storing the application programs and data other than the remoter control program, the thin client (TC) terminal not including the storage such as a hard disk device can be used as a terminal of the server-based computing system. After the enforcement of the Act for Protection of Personal Information, the TC terminal has attracted attention as a terminal that does not leak personal information. The use of the server-based computing system in which the TC terminals is widely spreading today.

For example, a server-based computing system employing thin client terminals has been described as a system to cope with information leakage in pages 50 to 53 of "Nikkei Communication, 25 Nov. 2005". This article describes aspects of the system such as a system of network boot type and a system of blade PC type in addition to a system of screen transfer-type of the prior art.

SUMMARY OF THE INVENTION

In the conventional TC system, there does not exist any remarkable problem in an operation to transmit screen data including still pictures in which the amount of the differential data reflecting the change of the transfer screen data is relatively small. However, if it is desired to transmit video data such as mobile pictures in the form of the screen data through the remote control communication path (screen data transfer by the remote control communication path), the amount of differential data is increased. As a result, quite a large amount of differential data continuously flows through the IP network, which disadvantageously increases the load on the IP network. If the IP network band cannot be secured, there occurs a loss of differential data. Resultantly, there appears a problem of deterioration in the video (mobile picture) quality.

It is therefore an object of the present invention to provide a thin client system and a server device suitable to transfer (to transmit and to deliver) the video (mobile picture) data to the TC terminal side and a TC terminal which receives and displays the transfer information transferred as above.

Another object of the present invention is to provide a thin client system, a server device, and a method wherein the TC terminal is available as a TV conference terminal.

The present invention has been devised in consideration of the objects. On the TC server device side, screen data (still picture) to be displayed on the TC terminal is created and is sent (delivered) to the TC terminal side via "remote control—IP network" (a logical communication path), namely, a remote control communication path including the remote control. To the screen data, a transmission color is set to beforehand determine an area in which the video delivered as separate data with respect to the screen data is reproduced. The video (mobile picture) data is delivered to the TC terminal side through a communication path (a logical communication path of the IP network) other than the remote control communication path. That is, the remote control path is not used to deliver the video (mobile picture) data.

On the TC terminal side, the screen data and the video (mobile picture) data sent from the TC server device are received via respectively different communication paths. The screen data and the video (mobile picture) data are combined with each other in a screen overlay scheme to produce displayable data.

According to the present invention, the video (mobile picture) data is transmitted, via the communication path different from the remote control communication path employed to transmit the screen data, to the TC terminal in a data format optimal to transmit the video data, and hence it is possibly to suppress the network band consumption.

Since the video (mobile picture) data is transmitted in the data format optimal to reproduce mobile pictures, not still pictures, the TC terminal side for reproduction of mobile pictures can reproduce the video data with high picture quality.

By installing an audio data transmitting module and a video data transmitting module on the TC terminal side, the TC terminal can be used as a TV phone terminal or a TV conference terminal capable of communicating audio data and video data with a communication terminal (e.g., a video delivery server device) other than the TC server device.

Since the TC terminal is configured such that data, audio data of voice and sound, video data, and the like cannot be saved therein, if the communication terminal is a delivery server device to deliver music pieces and video data, the TC terminal can be possibly used as a terminal capable of protecting copyright in the delivery services of music pieces and video data.

Other objects, features and advantages of the invention will become apparent from the following description of the embodiments of the invention taken in conjunction with the accompanying drawings.

DESCRIPTION OF THE EMBODIMENTS

Figure 1:
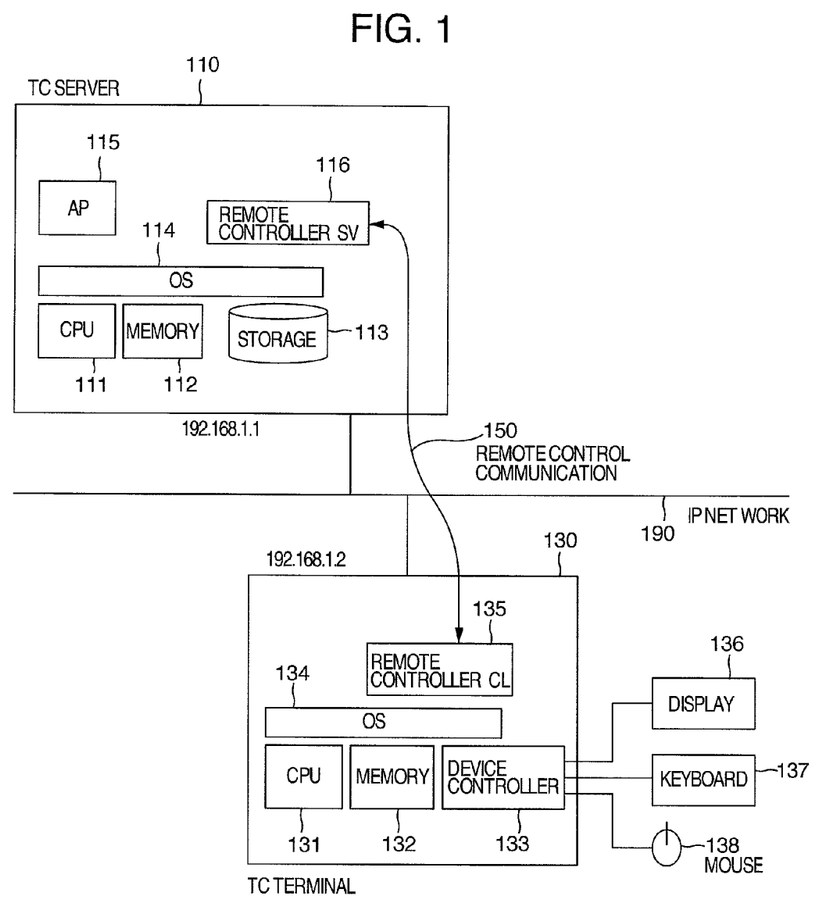
FIG. 1 is a block diagram showing an outline of structure of a general thin client system.

FIG. 1 shows an outline of a TC system using a TC terminal as a premise to explaining an embodiment of the present invention.

In FIG. 1, the TC system includes a TC terminal 130 which can be freely used mainly by an individual, a TC server device 110 to manage application programs and data which can be accessed for execution of the programs, and an IP network 190 to connect the TC terminal 130 to the TC server device 110.

The TC server device 110 includes an operating system (OS) 114, an application program 115 including various application programs, a storage 113, a Central Processing Unit (CPU) 111, a memory 112, a remote controller (remote controller SV) 116, etc.

The TC terminal 130 is configured such that data transferred from the TC server device 110 cannot be stored in an external storage such as a fixed magnetic disk device. The TC terminal 130 mainly includes input/output devices such as a display 136, a keyboard 137, and a mouse 138 and their controller, i.e., a device controller 133; a remote controller (remote controller CL) 135 to conduct data communication, an operating system (OS) 134, a CPU 131, and a memory 132.

Data processing of the TC terminal 130 desired by the user is carried out by the application program 115 on the TC server device 110. Therefore, it is not required for the TC terminal 130 to update the application program and hence the management cost can be reduced on the terminal side. Moreover, since the TC terminal 130 does not keep secret data therein, even if the TC terminal 130 is lost or stolen, the information leakage can be prevented to thereby guarantee high security.

Input/output information (screen data and keyboard/mouse data) are communicated between the TC server device 110 and the TC terminal 130 by use of IP packets through a communication path (session) including the remote control SV 116, the IP network 190 (logical communication path), and the remote controller CL 135.

The communication path (session) to transfer screen data from the TC server 110 via the remote controller SV 116, the IP network 190, and the remote controller CL 135 to the TC terminal 130 will be referred to as a remote control communication path hereinbelow.

In the TC system, screen data (a screen of an application program) 160 created by the application program 115 of the TC server device 110 is transferred via the remote control communication path to the TC terminal 130 to be displayed on the display 136 of the TC terminal 130.

Figure 2:
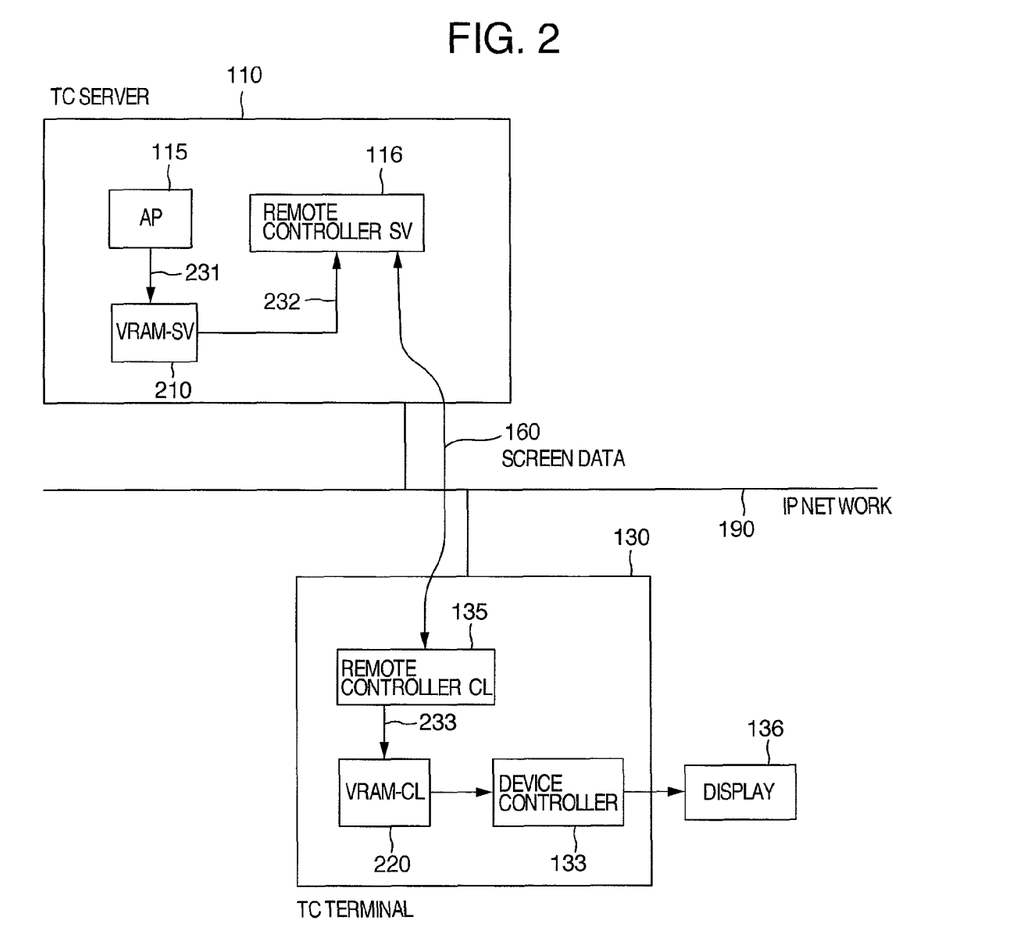
FIG. 2 is a block diagram to explain a flow of operation to display a screen in the thin client system.

FIG. 2 shows an outline of processing in which screen data as output information from the TC server device is displayed on the TC terminal.

The configurations of the TC server device and the TC terminal are partly omitted in FIG. 2, but are substantially equal to those of the TC server device 110 and the TC terminal 130 of FIG. 1. A Video Random Access Memory (VRAM)—SV 210 as a screen display memory of the TC server device 110 is part of the memory 112. A VRAM-SV 220 as a screen display memory of the TC terminal 130 is part of the memory 132.

In FIG. 2, if the application program 115 of the TC server device 110 carries out screen display processing, the application program 115 writes screen data 231 in the VRAM-SV 210. The remote controller SV 116 continuously monitors the screen data of the VRAM-SV 210. If an update of the screen data is detected, the remote control SV 116 acquires differential data (arrow 232) and transmits the data via the remote control communication path to the remote controller CL 135. The remote controller CL 135 receives the differential data and then writes the data as screen update information in the VRAM-CL 220 (arrow 233). The screen information updated as a result is displayed via the device controller 133 on the display 136.

Through the sequence of processing steps, the result of the application executed on the TC server device 110 is displayed on the side of the TC terminal 130.

Figure 3A:
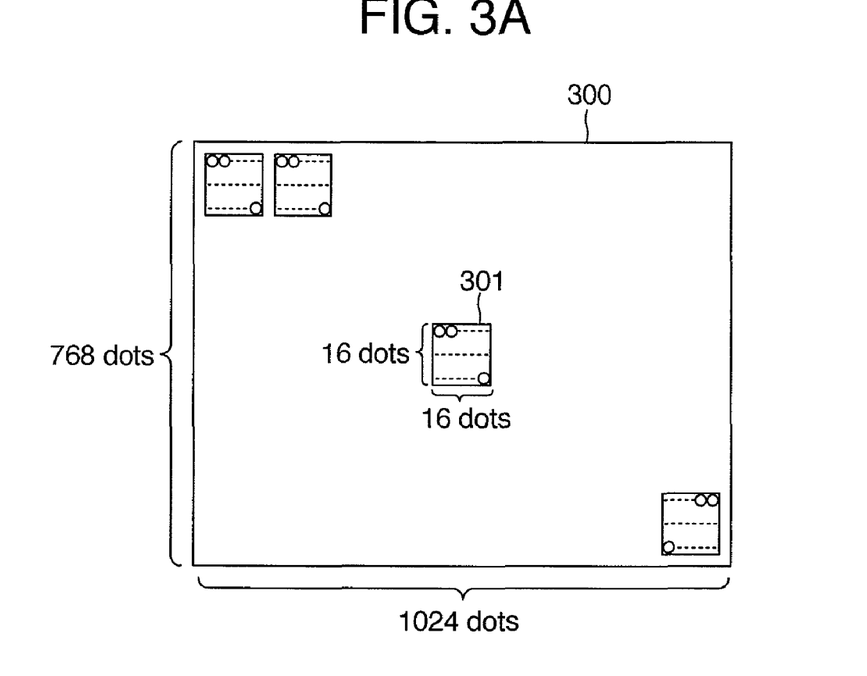
FIG. 3A is a diagram showing a screen block image.
Figure 3B:
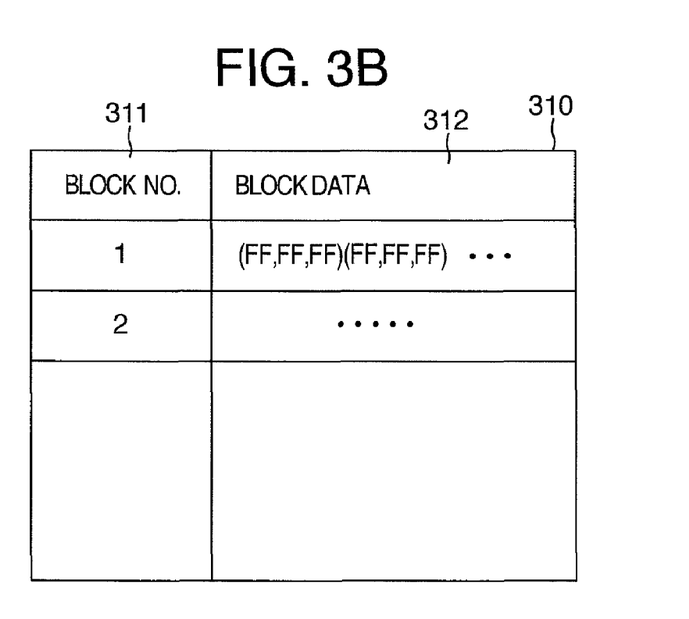
FIG. 3B is a diagram showing a screen block table.
Figure 4:
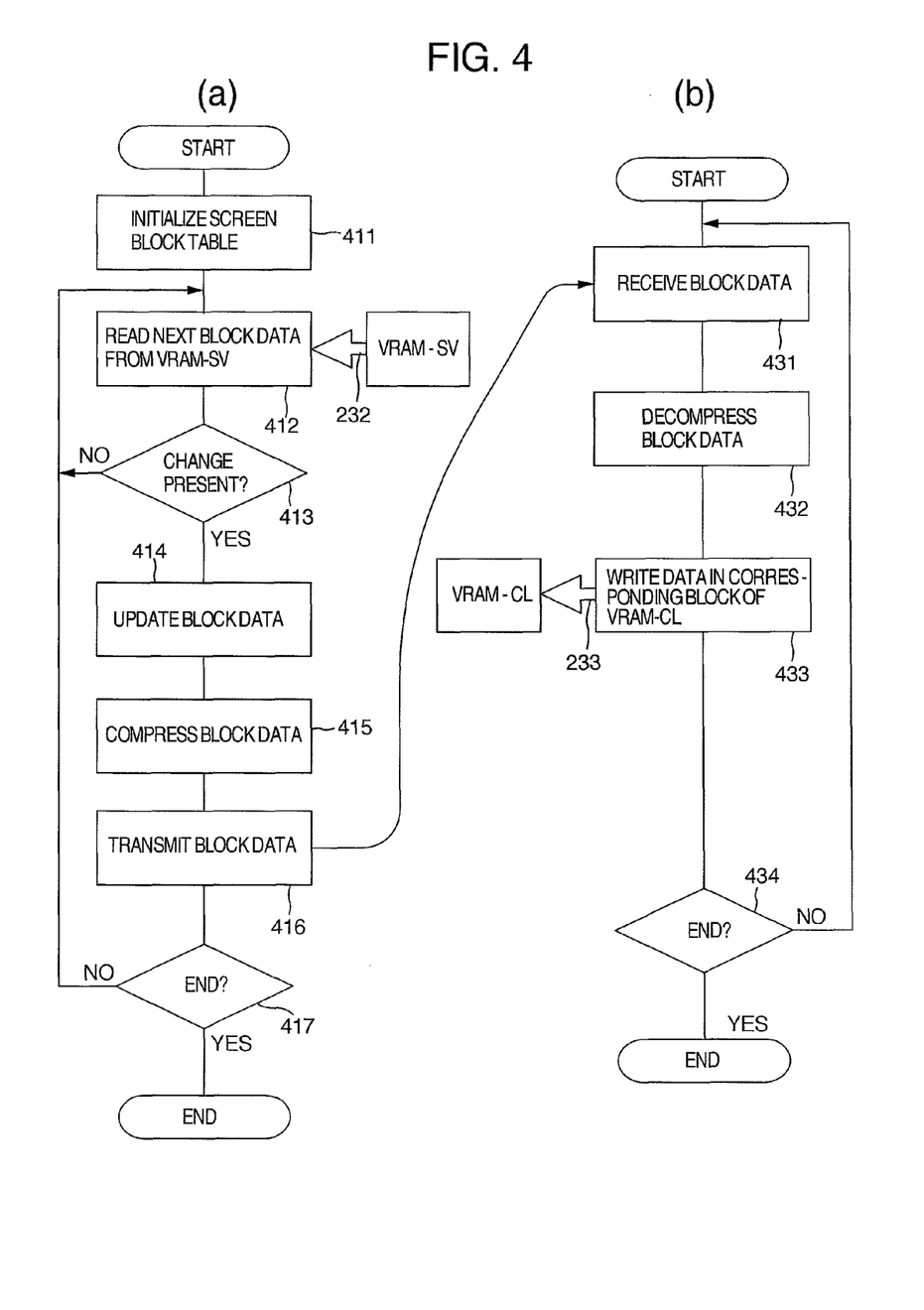
FIG. 4 is a flowchart showing a communication flow of screen data by the remote control.

Referring next to FIGS. 3A, 3B, and 4, description will be given in detail of the remote control processing flow in the screen data transfer processing shown in FIG. 2.

FIG. 3A shows a screen image of the TC server device 110. Screen data 300 is entirely kept in the VRAM-SV 210. The screen data 300 includes information items respectively corresponding to screen resolution and the number of display colors. For example, the screen resolution is expressed as 1280 dots×1024 dots or 1024 dots×768 dots. The number of display colors are represented as, for example, 24-bit, 16-bit, or 8-bit colors. To detect a screen update, the screen is subdivided into units of areas having a fixed size. In this case, the screen resolution and the block size are respectively represented as, for example, 1024 dots×768 dots and 16 dots×16 dots, and hence the screen image 300 and the screen block 301 are drawn as shown in FIG. 3A.

FIG. 3B is a diagram to explain the screen block table 310. Each entry of the screen block table 310 includes a block number field 311 to store a block number sequentially assigned to a screen block beginning at an upper-left screen block and a block data field 312 to keep block data corresponding to the block number. The block data 312 keeps therein a string of data for color information for each dot. For example, in the 24-bit color representation, "white" is expressed as (FF,FF,FF) using Red-Green-Blue (RGB) data. The screen block table 310 is used by the remote control SV 116 to detect presence or absence of a screen update.

In FIG. 4, part (a) is a screen data transmission processing flow of the remote controller SV 116 and part (b) is a screen data reception processing flow of the remote controller CL 135.

In part (a), the remote control SV 116 first initializes the screen block table 310 (step 411). For example, each block data of the table 310 is set to (FF,FF,FF).

Next, if an update is detected in the screen information, control enters a loop to transmit the differential data to the remote controller CL 135 (steps 412 to 417). That is, control enters a screen monitor loop in which the remote controller SV 116 sequentially obtains screen information from the upper-left block to the lower-right block in FIG. 3A in a zigzag block sequence. When the processing is finished for the lower-right block, control returns to the upper-left block.

In the first screen monitor loop, the remote controller SV 116 obtains screen block data corresponding to the block number designated by the VRAM-SV 210 (step 412).

Next, the remote controller SV 116 compares the screen block data with data of the associated block number stored in the screen block table (step 413).

If the data matches with the data stored in the table, it is determined that the screen has not been updated. Control returns to processing to acquire next block data (step 412).

If it is determined as a result of data comparison that the data does not match each other, it is recognized that the screen has been updated and the obtained screen block data is stored as the value of the associated block number (step 414).

Next, the screen block data is compressed (step 415). Various compression methods are available. For example, there are used a subtractive color compression method in which, for example, 24-bit colors are converted into 16-bit colors or 8-bit colors and a Joint Photographic Experts Group (JPEG) compression method to compress still pictures.

Subsequently, the screen block data compressed as above is sent together with the block number via the remote control communication path to the remote controller CL 135 (step 416).

Finally, the sequence of processing steps are repeatedly executed at a predetermined interval of time until the program of the remote controller SV 116 is terminated (step 417).

Description will now be given of the processing flow of the remote controller CL 135 by referring to part (b).

The remote controller CL 135 receives the screen block data from the remote controller SV 116 and writes the data in the associated VRAM-CL 220 to thereby display an updated screen on the display 136 of the TC terminal 130.

First, the block number and the screen block data are received from the remote controller SV 116 (step 431)

The screen block data compressed as above is expanded or decompressed (step 432).

The decompressed data is written in an associated area of the VRAM-CL 220 corresponding to the block number (step 433). Resultantly, the contents of the screen update are presented on the display 136.

Finally, the sequence of processing steps are repeatedly executed until the operation of the emote controller CL 135 is finished.

In the screen data communication between remote controllers shown in parts (a) and (b) of FIG. 4, it is possible that only the blocks in which a change takes place in the screen is efficiently transmitted.

The screen data transfer technique is not attended with any particular problem in an operation to transmit screen data basically including still pictures as described above. Application programs for documents and table calculations display screens of still pictures. Therefore, the differential data to be transferred is relatively a small amount of data, and hence the load imposed on the network does not particularly become a problem to be solved.

However, for an application program which reproduces video (mobile picture) data, the screen is updated quite frequently. In particular, if the screen size of the video (mobile pictures) is large, the screen update frequency is increased and the area to be updated becomes greater. If this processing is executed in the processing method shown in FIG. 4, it is determined in the screen block change judge processing (step 413) that the change is present for almost all blocks for the video reproduction, and hence these blocks are sent to the TC terminal side. That is, on the side of the TC server device 110, one video (mobile picture) data item is subdivided into a plurality of blocks to be compressed in block units, and the blocks are transmitted to the TC terminal 130. On the side of the TC terminal 130, the data received in block units are assembled to resultantly produce one original video screen. This hence leads to a problem, that is, the processing method is not efficient to transmit the video (mobile picture) data and the load on the network is increased.

The present invention is devised to remove the problem. Description will now be given of embodiments of the present invention.

1. Embodiment 1

Figure 5:
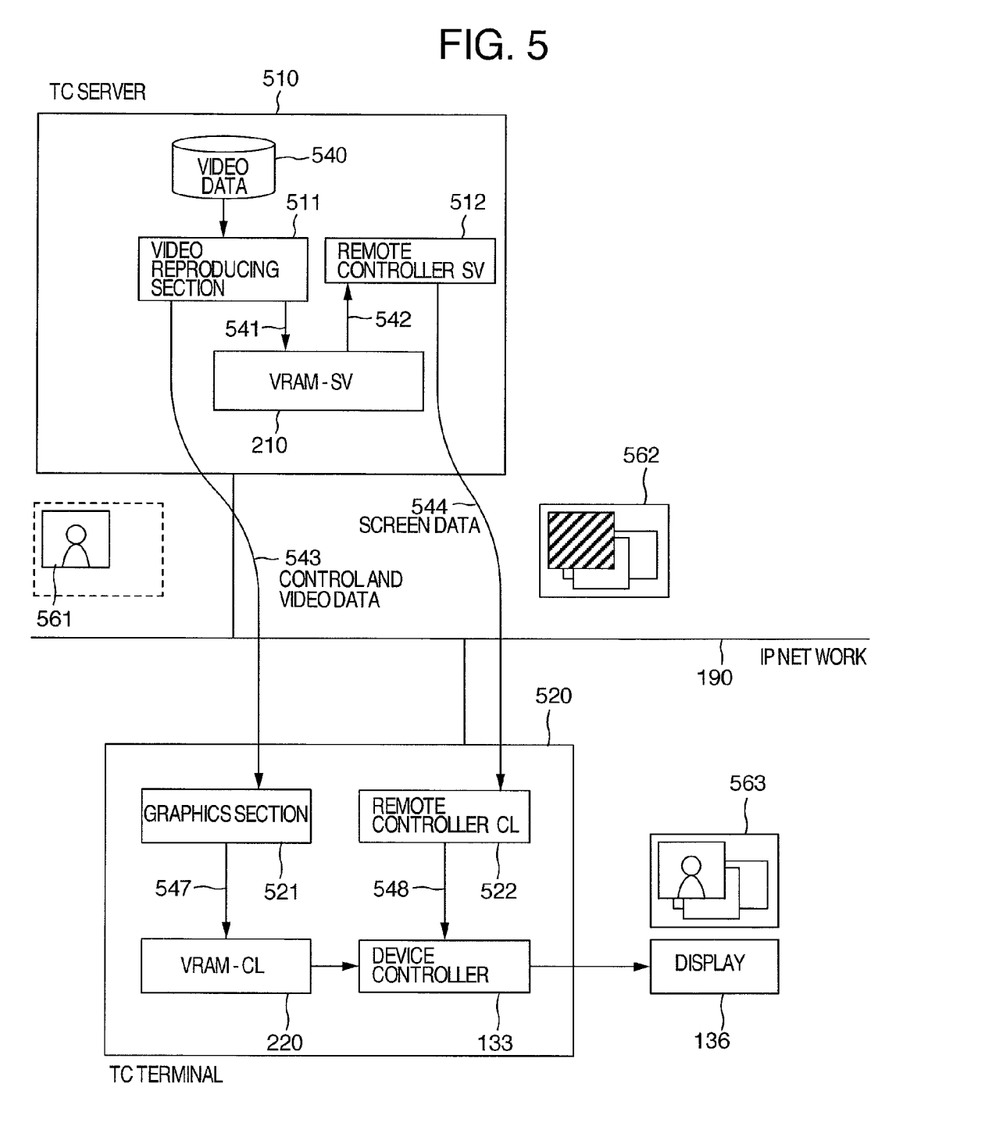
FIG. 5 is a diagram showing a configuration to display video data with high picture quality according to the present invention.

FIG. 5 conceptually shows a method of displaying video data according to the present invention. That is, FIG. 5 shows a method to reproduce the video (mobile picture) data with high picture quality in the TC system using the TC terminal shown in FIG. 1.

In FIG. 5, part of the TC server device 510 is omitted, but the configuration of the device 510 is almost the same as that of the TC server device 110 shown in FIGS. 1 and 2. Also, the TC server device 510 includes a video reproducing section 511 to transmit the video of the video data via a logical communication path (other than the remote control communication path) of the IP network 190. The call control between the server device and the terminal is conducted, for example, according to the Transmission Control Protocol (TCP) or the User Datagram Protocol (UDP). The video communication is carried out by use of, for example, TCP and UDP. Part of the TC terminal 520 is omitted, but the terminal 520 is of the configuration almost the same as that of the TC terminal 130 shown in FIGS. 1 and 2. The terminal 520 additionally includes a graphics section 521.

According to the present invention, to send screen data from the TC server device 510 to the TC terminal 520 in a method in which the conventional screen data is sent via a communication path 544 and the video data is sent via a communication path 543 such that the screen data and the video data are combined with each other on the receiver side to display the screen data in a screen overlay scheme as shown in FIG. 5.

The video reproducing section 511 obtains the video data stored in the video data storage 540 and distributes the data via the communication path 543 other than the logical communication path (non-remote-control communication path), i.e., the remote control communication path including the remote control. The screen image of the video data is as indicated by a reference numeral 561 in FIG. 5. The TC terminal 520 receives the video data, and the video graphics section 521 writes the video data in the VRAM-CL 220. On the other hand, the screen data has already been written via the remote controller CL in the VRAM-CL 220. The screen image of the video data is as indicated by a reference numeral 562 in FIG. 5. The video graphics section 521 writes the video data using a screen overlay scheme. By use of the screen overlay scheme, a screen created by reproducing video (mobile picture) data can be combined with a still picture. Therefore, the video (mobile picture) data can be displayed with high picture quality. As a result, the screen image finally presented on the display 136 is as indicated by a reference numeral 563 in FIG. 5.

Referring next to the processing flow of FIG. 6, description will be given of the video (mobile picture) data transfer and display according to the present invention.

Figure 6:
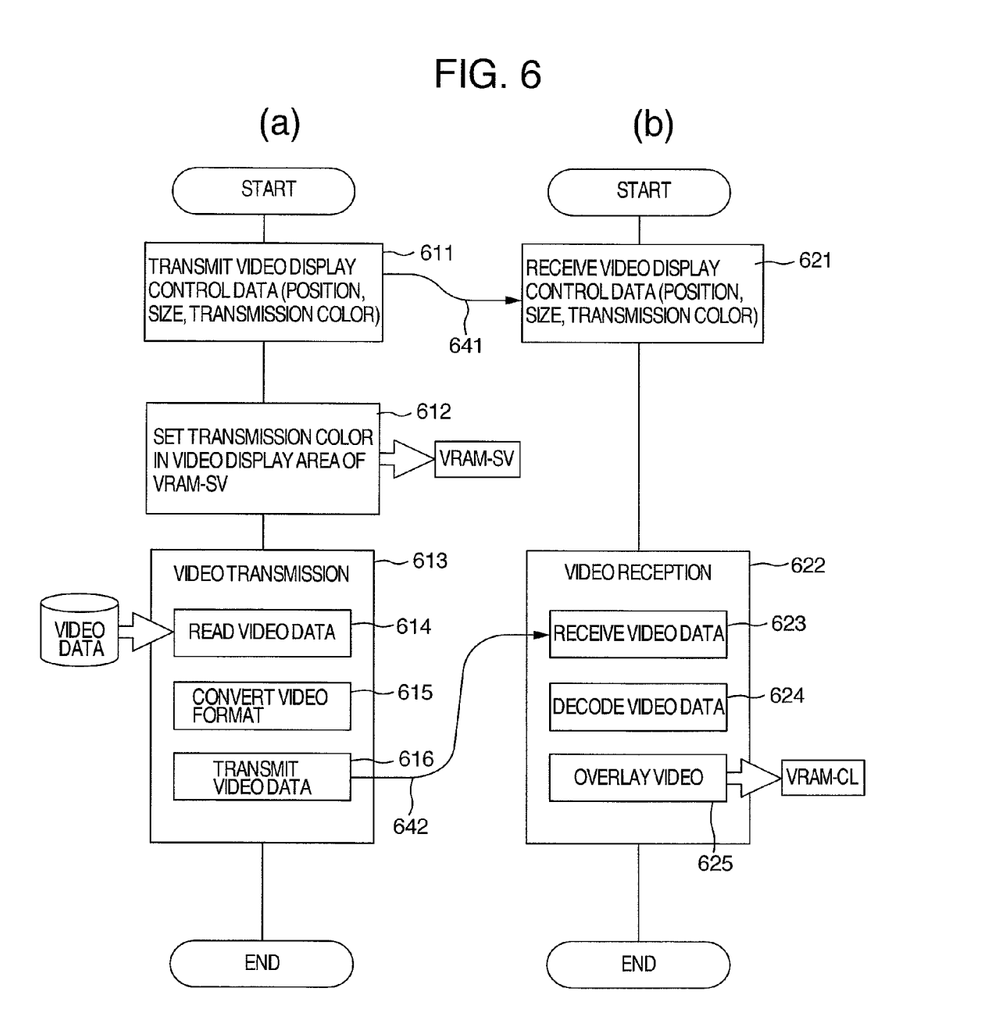
FIG. 6 is a flowchart showing video transmission processing and graphics processing in accordance with the present invention.

In FIG. 6, part (a) shows a video reproduction flow on the side of the TC server device 510 and part (b) shows a graphics processing flow on the side of the TC terminal 520.

First, the control data of video data to be displayed is transmitted via the remote control communication path to the TC terminal 520 (step 611). The video display control data includes a video display position, a video display size, and a transmission color. The video display position is a screen position at which the video data set by the video reproducing section 511 is displayed. The video display position is represented by the number of dots relative to the upper-left corner of the screen, for example, represented as (100,100). The video display size is a screen size to display the video set by the video reproducing section 511 and is represented by the numbers of dots respectively in the vertical and longitudinal directions. The video display size is beforehand determined according to the video format depending on cases, for example, 176 dots×144 dots in the Quarter Common Intermediate Format (QCIF) and 320 dots×240 dots in the Quarter Video Graphics Array (QVGA). The transmission color is color data defined for the screen overlay. If the transmission color is set for dots, the dots are handled as being transparent, and hence a color not often used is defined as the transmission color and may be, for example, (FF,00,FF) in the RGB representation.

Next, a transmission color is set to the video display area on the VRAM-SV (step 612). When the transmission color is set to the VRAM-SV as a result of the processing, the associated data is sent, by the screen data transfer processing shown in FIG. 4, as differential data of the screen to the TC terminal side and is written via the remote control CL 522 in the VRAM-CL 220.

Video transmission processing is then executed (step 613). In the processing, by repetitiously executing a video data read step 614, a video data format conversion step 615, and a video data transmission step 616, a sequence of video data items are transmitted. In general, the video data items are recorded in various formats (video formats), and hence the video data is converted through the video format conversion 615 into video data in a format which can be read by the TC terminal side. It is desirable that the video format conversion mitigates the load on the network and is optimized for the TC terminal.

Part (b) of FIG. 6 shows a processing flow of the graphics section 521 of the TC terminal 520.

First, the video display control data is received from the TC server and then the video display position, the video display size, and the transmission color are stored in the memory 132 (step S621).

In the video reception processing, the video data is sequentially received from the TC server device to be assembled, and the resultant data is written in the VRAM-CL to thereby reproduce the video data (step 622). In the video reception processing 622, the video data is written in the VRAM-CL through a sequence of processing steps including a video data reception step 623, a video data decoding step 624, and a screen overlay step 625. The video data is written in the VRAM-CL according to the display position and the display size received in the processing step 621, according to the screen overlay scheme by use of the transmission color.

According to the method, by using a video format optimal to transfer the video data, the load of the network can be reduced to the maximum extent.

Also, by reproducing the video data with high picture quality by use of the screen overlay, the video data can be reproduced with high picture quality, and hence the video data can be displayed with high picture quality on the TC terminal side.

2. Embodiment 2

To display the video data in accordance with the present invention shown in FIGS. 5 and 6, if the remote control screen data processing shown in FIG. 4 is employed without any modification, the screen overlay does not appropriately function in the video display area. That is, if subtractive color processing is executed for the screen block data including a transmission color, the color information of the transmission color is changed. Therefore, the screen overlay is not appropriately achieved for the section of the color information changed as above.

Figure 7:
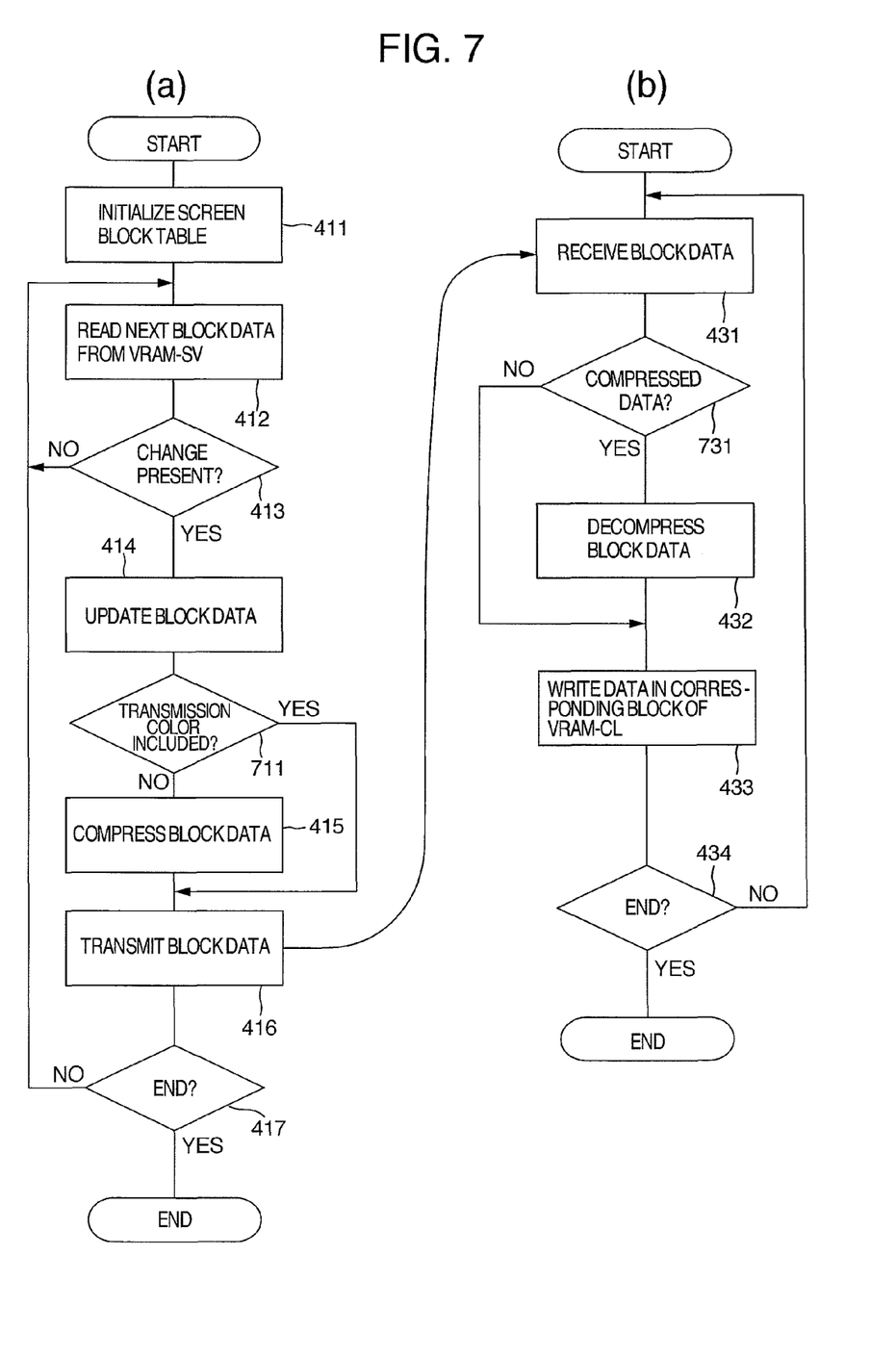
FIG. 7 is a flowchart showing a communication flow to communicate screen data by the remote control according to the present invention.

FIG. 7 is a flowchart showing remote control processing to solve the problem. That is, in the processing of the TC server in part (a) of FIG. 4, there is additionally disposed a judge step on the TC server side to determine whether or not the screen block data includes a transmission color (step 711). If it is determined in this step that the data includes a transmission color, the system transmits the block data without compressing the data. On the other hand, in the processing of the TC terminal in part (b) of FIG. 4, there is additionally disposed a step of determining, after the data is received, whether or not the data is compressed data (step 731). This is determined on the basis of the capacity of the block data. If the data has not been compressed, the data is directly written in the VRAM-CL.

As a result, the transmission color set on the TC server device side is correctly transmitted to the TC terminal side and is set to the VRAM-CL. Therefore, the data associated with the screen overlay is appropriately displayed in the video display area.

3. Embodiment 3

Figure 8:
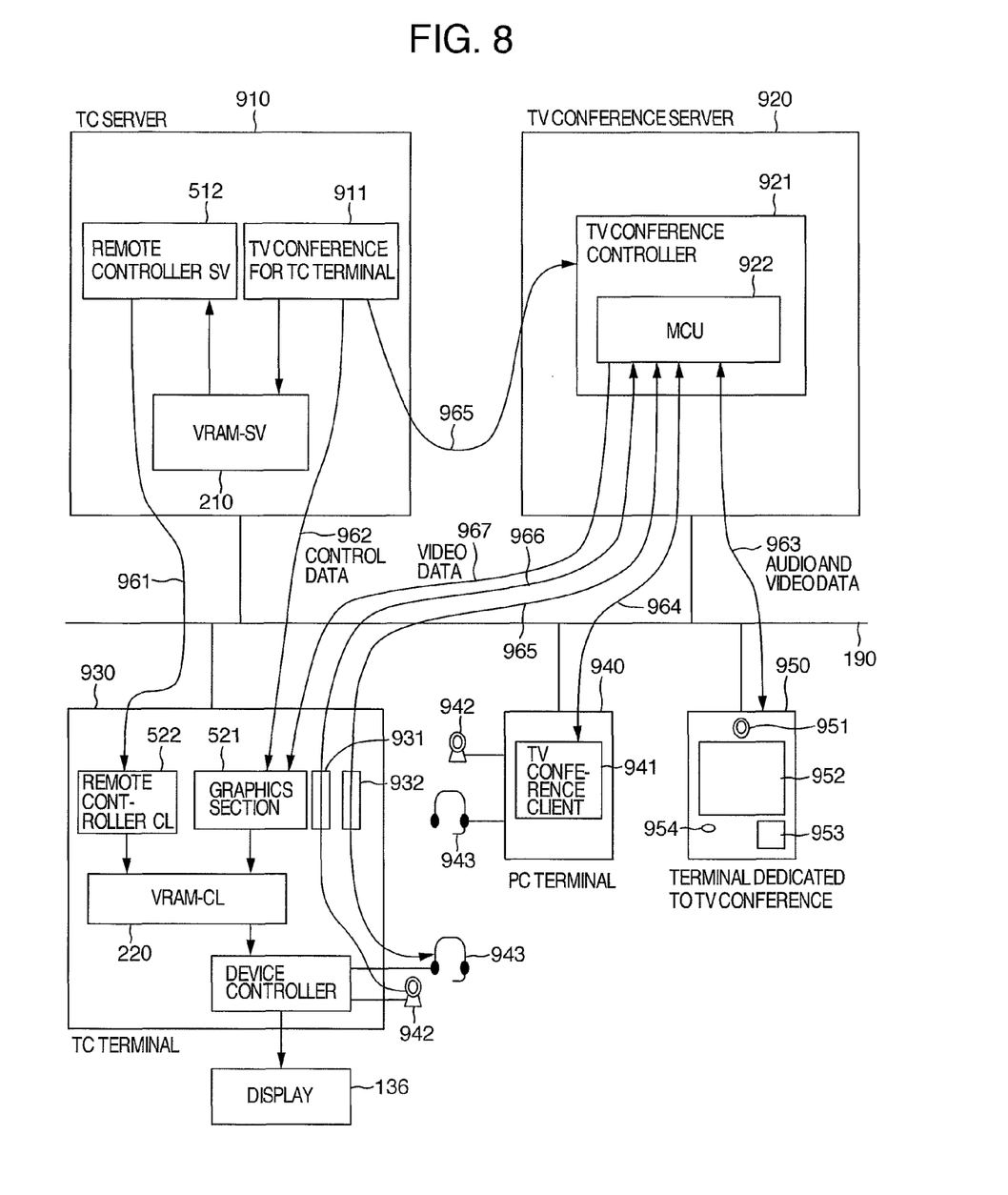
FIG. 8 is a diagram showing a configuration in which a thin client terminal is available as a TV conference terminal.

FIG. 8 is a diagram to explain structure and operation of a TV conference system in which the TC terminal is employed as a TV conference terminal.

The TV conference system includes a TV conference server device 920, TV conference terminals 930, 940, and 950, and an IP network 190 to connect these constituent components to each other.

The TV conference server device 920 includes a TV conference controller 921 to control the overall operation of the TV conference system. It is required in the TV conference to share audio data and video data among a plurality of attendees of the conference at respective places. For this purpose, the TV conference controller 921 includes a Multipoint Control Unit (MCU) 922. In a TV conference for a plurality of terminal locations, the MCU 922 receives audio and video data from each of the TV conference terminals. For the audio data, the MCU 922 first conducts a data mixing operation and then sends the resultant audio data to the respective TV terminal. For the video data, the MCU 922 executes data combination and converts its data format depending on to the type of the TV conference terminal as the data transmission destination.

The TV conference terminals are the TV conference dedicated terminal 950, the PC terminal 940, and the TC terminal 930. To make the TC terminal 930 serve a function of the TV conference terminal, a TV server device 910 is configured.

The TV conference dedicated terminal 950 includes a camera 951, a video display screen 952, a microphone 954, and a speaker 953. The terminal 950 is capable of communicating audio data and video data with the TV conference server device 920 (963).

To serve the function as a TV conference terminal, the PC terminal 940 includes Universal Serial Bus (USB) ports to connect to the camera 942 and a headset 943. The PC terminal 940 also includes a main module loaded with an application program 941 which can control these devices to communicate audio data and video data with the TV conference server device 920 (964).

To use the TC terminal 930 as a TV conference terminal, the TC server device 510 and the TC conference terminal 520 of FIG. 5 additionally include necessary functions. That is, a TV conference program for TC terminal 911 is added to the TC terminal 930. The TC terminal 930 is connected to the camera 942 and the headset 943. Also, a video transmitter 931 and an audio transceiver 932 are added to the TC terminal 930. The TC serve device 910 and the TC terminal 930 configured as above are equivalent to the PC terminal 940 serving the function of a TV conference terminal.

The audio and video data communicated in the TV conference system constructed as above is transferred via the IP network 190 in the form of IC packets thereon. Between the TV conference server device 920 and each TV conference terminal, the communication is bidirectionally conducted on the basis of IP addresses of the device 920 and the conference terminal. The TV conference program for TC terminal 911 conducts communication with the TV conference server device 920 and works as a client with respect to the server device 920.

In the TC terminal 930, the audio transceiver 932 conducts communication of audio data. The audio transceiver 932 receives audio data of voice and sound which is produced by a microphone of the headset 943 and which is inputted therefrom and then transfers the audio data to the MCU 922. Conversely, the audio transceiver 932 receives the audio data from the MCU 922 to resultantly sound a speaker of the headset 943.

In the TC terminal 930, the video transmitter 931 transmits the video data therefrom. The video transmitter 931 receives the video data which is shot by the camera 942 and which is inputted from the camera 942 connected to the TC terminal 930 and then transmits the video data to the MCU 922.

In the TC terminal 930, the video data is received by use of a method of the present invention. That is, while the TC server device 510 transmits the video data in FIG. 5, the MCU 922 transmits the video data according to the configuration of FIG. 8.

The method of the present invention is used so that the graphics section 521 receives the video data from the MCU 922 to display the video data on the TC terminal with high picture quality.

First, the TV conference program for TC terminal 911 sets the transmission color in the display area of the video data received from the MCU 922 to write the video data in the VRAM-SV 210. The remote controller SV 512 and the remote controller CL 522 write the screen data including the transmission color in the VRAM-CL 220 according to the processing flow shown in FIG. 7.

Next, the program for TC terminal 911 notifies the TC terminal 930 of control data to display the video data on the TC terminal 930, the control data including the video display position, the video display size, and the transmission color (962). The operation corresponds to steps 611 and 621 shown in FIG. 6. In addition, the program 911 also notifies an IP address of the TV conference server from which the actual video data is transmitted.

The program for TC terminal 911 then issues a video data transmission request to the TV conference controller 921. The request includes parameters such as a transmission destination IP address including an IP address of the TC terminal 930 and a video format including the video format handled by the graphics section 521.

Upon receiving the video data transmission request, the TV conference controller 921 transmits the video data in the designated video format to the designated IP address (967).

The graphics section 521 receives the video data (967) and writes, by use of the screen overlay scheme, the data in the VRAM-CL 220 to which the transmission color is beforehand set, to thereby produce an overlay display image of the data.

As a result, the video data items of plural points thus processed by the MCU 922 into synthesis data, which is presented on the display 136 of the TC terminal 930 with high picture quality.

In accordance with the method of the present invention, the video can be displayed with high picture quality on the TV phone between two persons and in the TV conference for terminals at many points. It is therefore possible to clearly display, for example, the change of expression on the face of the communicating partner, which is one of the important aspects in the TV conference.

Since the audio and video data can be transferred in the optimal format through the IP network, the load imposed on the network can be possibly reduced.

Also, the TV conference server 920 may be a desired video distribution server and is capable of receiving the audio and video data by use of the configuration of the TC server device 910 and the TC terminal 930 shown in FIG. 8. This makes it possible for the viewers of the TC terminal to enjoy video commercials and films with high picture quality.

It is also possible in a business information system to view on the TC terminal the video contents such as video commercials with high picture quality. The TC terminal can be used as a terminal for the TV phone system and the TV conference system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A thin client system, comprising:
a client server device working with an application system which sends video data;
a client terminal which activates a data generator of the client server device through remote control and which receives the data generated by the data generator to display the data; and
a network for coupling the client terminal with the client server device, to transmit data between a remote controller of the client server device and a remote controller of the client terminal,
wherein:
the thin client system is coupled to the application system which includes an application controller for controlling the transmission of the video data to the client terminal via the network,
the client server device comprises:
a screen data generator which generates screen data including transmission color data defining an area on which reproduced video data is to be displayed;
an application function unit for the client terminal;
a screen data storing unit which stores the screen data generated by the screen data generator under control of the application function unit; and
a screen data transmitter, including the remote controller, which transmits the screen data stored in the screen data storing unit via the network to the client terminal, under control of the application function unit,
the client terminal comprises:
a screen data receiver which receives the screen data sent from the client server device;
a video data receiver which receives the received video data sent from the application system;
a storing unit which stores the received screen data and the received video data; and
a graphics unit which displays the screen data and the video data as one screen, and
the client server device requires the application controller of the application system to transmit the video data to the client terminal under control of the application function unit, such that the application controller of the application system transmits the video data to the client terminal in response to the request of the client server device,
the client terminal receives the screen data sent from the client server device via a remote control communication path including the remote controllers and the network, and receives the video data sent from the application system via a non-remote-control communication path which is different from the remote control communication path, and displays the video data on the area defined by the transmission color data of the screen data using a screen overlay scheme,
wherein if a size or position of the video display area is to be changed on the client terminal when the client terminal is receiving the video data:

the client server device transmits to the client terminal, differential screen data including the transmission color data corresponding to the changed video display area, and
the client terminal displays the received screen data and displays the video data on the changed video display area, while the client terminal continues to receive the video data.

2. A thin client system according to claim 1, wherein the video data transmitter conducts compression processing for the screen data except the area defined by the transmission color data, and thereby making it possible for the client terminal to display the area with higher picture quality.

3. A client terminal device which can remotely control a client server device comprising:
a remote controller which conducts remote control via a network to control the client server device;
a screen data receiver which receives screen data transmitted from the client server device via a remote control communication path including the network and the remote controller, and stores the received screen data in a display memory, the screen data including transmission color data determining an area on which video data is displayed;
a video data receiver which receives video data from a video distribution server connected to a network and controlled by a video data transmission function unit of the client server device, the video data being transmitted via a non-remote-control communication path which is different from the remote control communication path and which does not include the remote controller;
a graphic unit which writes the received video data on the area determined by the transmission color of the received screen data in the display memory to display data in the display memory; and
wherein if a size or position of the video display area is to be changed on the client terminal device when the client terminal device is receiving the video data:
the client terminal device receives from the client server device, differential screen data including the transmission color data corresponding to the changed video display area, and displays the video data on the changed video display area while the client terminal device continues to receive the video data.

4. A client terminal device according to claim 3, wherein the graphic unit conducts an overlay display operation on the display memory to display an overlay screen image including the screen data and the video data from the video distribution device, by using a screen overlay scheme.

5. A client server device, comprising:
a screen data generator which generates screen data to be displayed at a client terminal under control of an application function unit which is remotely activated by the client terminal, the screen data consisting of a plurality of screen data blocks and including a transmission color data determining an area on which video data is reproduced;
a screen data transmitter which transmits application screen data via a remote control communication path including a network coupling the client server device with the client terminal and a remote controller of the client terminal which remotely controls the server device; and
a video data requester which requires an application server to transmit a video data to be displayed on the area determined by the transmission color data to the client terminal via a non-remote-control communication path different from the remote control communication path, wherein the screen data transmitter determines whether each screen data block includes the transmission color data and transmits the screen data block including the transmission color data without a compression process; and wherein if the client server device is instructed to change a size or position of the video display area on the client terminal:

the client server device transmits to the client terminal, differential screen data including the transmission color data corresponding to the changed video display area.

6. A method of transmitting application screen data and video data to a client terminal, performed by a client server device including an application function unit for a client terminal, comprising:

generating screen data by a data generator of the client server device;

transmitting the generated screen data via a remote control communication path including a remote controller of the client server device and a network connected to the client terminal; and requiring an application server to transmit video data to the client terminal via a non-remote-control communication path under control of the application function unit of the client server device, wherein the generated screen data transmitting step includes sub-steps of:

setting a video display area in which video is displayed at the client terminal;

setting a transmission color data determining the video display area on which the video data is reproduced;

transmitting control information on the set video display area and on the set transmission color data to the client terminal via the remote control communication path;

dividing the screen data into a plurality of screen data blocks;

comparing the screen data blocks of first application screen data already transmitted to the client terminal with the screen data blocks of second application data to be transmitted, to determine whether or not a change exists between two corresponding screen data blocks;

determining whether the changed screen data block includes the transmission color data;

if the changed screen data block does not include the transmission color data, conducting a compressing operation on the changed data block to transmit it;

if the changed screen data block includes the transmission color data, transmitting the changed screen data block without performing the compression operation; and wherein if the client server device is instructed to change a size or position of the video display area on the client terminal:

the client server device transmits to the client terminal, differential screen data including the transmission color data corresponding to the changed video display area.

7. A screen data and video data receiving and displaying method performed by a client terminal device, comprising:

receiving control information on an area on which the video data is displayed and on transmission color data which defines the area, from the client server device via a first communication path;

receiving, from a client server device via the first communication path, a changed screen data block of an application screen data which is generated by the client server and consists of a plurality of screen data blocks;

determining whether the received screen data block is compressed or not;

writing the received screen data block in a display memory if the screen data block has not been compressed, and writing the received screen data block in the display memory after decompression process if the screen data block has been compressed;

receiving video data from an application server via a second communication path which is different from the first communication path, the video data being encoded and a format of which has been converted into a predetermined format;

decoding the received video data and conducting predetermined display processing for the decoded video data;

writing, in the display memory, the video data on the area determined by the received control information to display the data in the display memory; and wherein if a size or position of the video display area is to be changed on the client terminal when the client terminal is receiving the video data:

the client terminal receives from the client server device, differential screen data including the transmission color data corresponding to the changed video display area, and displays the video data on the changed video display area while the client terminal continues to receive the video data.

8. A screen data and video data receiving and displaying method according to claim 7, wherein:

the display memory is a Video Random Access Memory (VRAM); and the screen data and the video data are displayed in an overlay image using a screen overlay scheme of the transmission color data.

* * * * *